H. R. SHERMAN.
TROLLEY GUARD AND FINDER.
APPLICATION FILED JUNE 10, 1909.
979,712.
Patented Dec. 27, 1910.
2 SHEETS—SHEET 2.
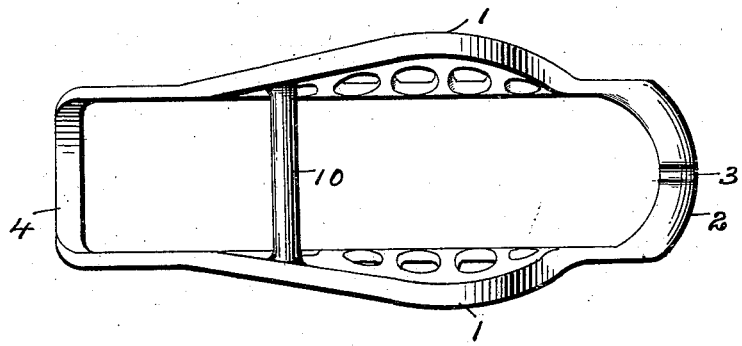
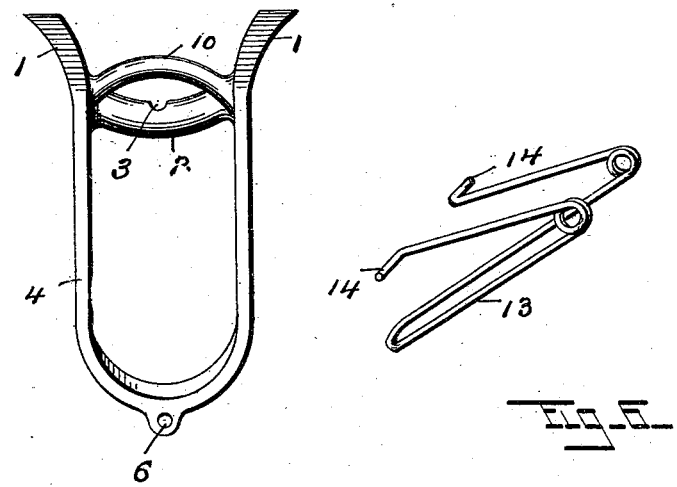
WITNESSES:
Florence H. Monk
Lucy Brennan
INVENTOR.
Henry R. Sherman
BY
ATTORNEY.

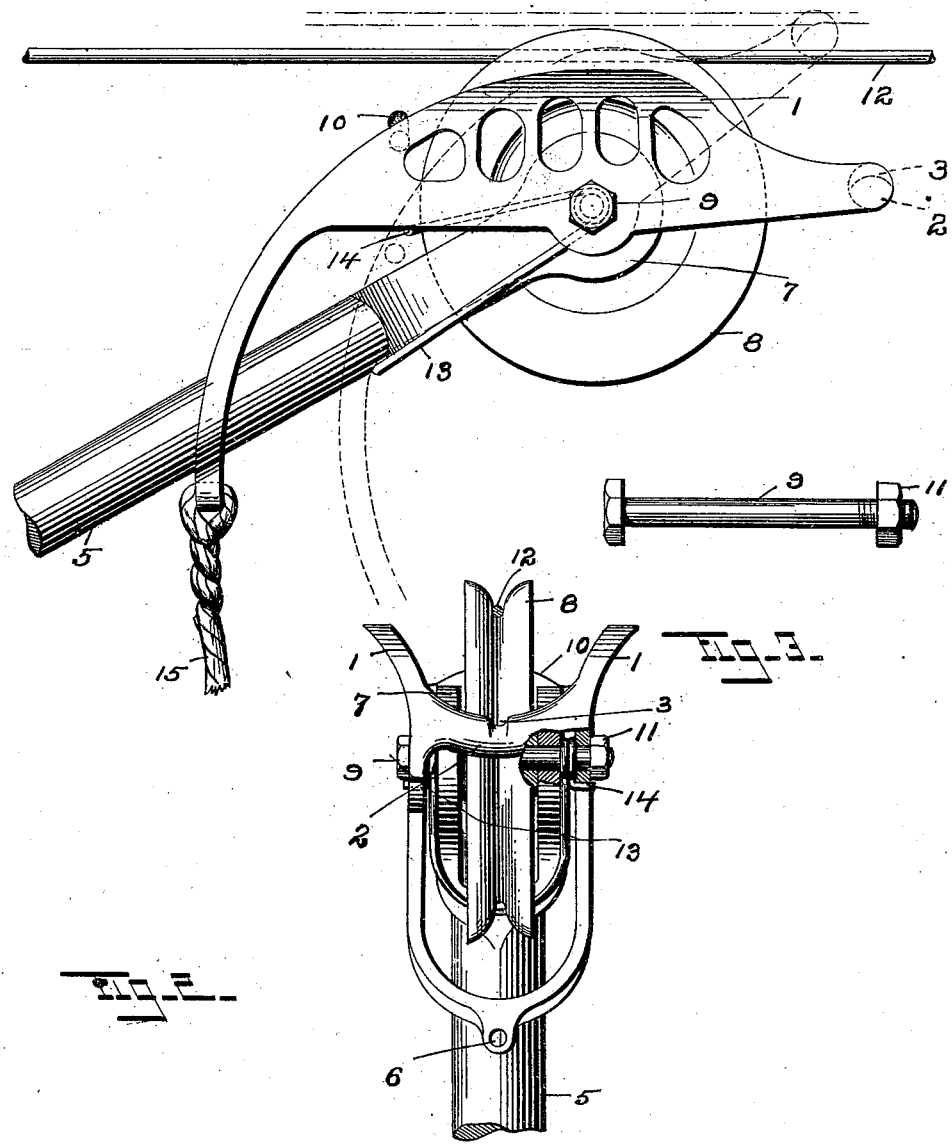

UNITED STATES PATENT OFFICE.

HENRY R. SHERMAN, OF HARTFORD, CONNECTICUT, ASSIGNOR OF ONE-HALF TO GEORGE H. WOODRUFF, OF NEW HAVEN, CONNECTICUT.

TROLLEY GUARD AND FINDER.

979,712.  Specification of Letters Patent.  Patented Dec. 27, 1910.

Application filed June 10, 1909. Serial No. 501,274.

*To all whom it may concern:*

Be it known that I, HENRY R. SHERMAN, a citizen of the United States, residing at Hartford, in the county of Hartford and State of Connecticut, have invented certain new and useful Improvements in Trolley Guards and Finders, of which the following is a specification, reference being had therein to the accompanying drawings.

My invention relates to new and useful improvements in trolley guards and finders, and has for its object, among other things, to provide a simple and economical device, that may be applied to any trolley pole, to catch the wire as it leaves the wheel and to return the trolley wheel easily and quickly to the wire when its contact therewith has been broken, either by accident or otherwise.

To these, and other ends, my invention consists in the trolley guard and finder having certain details of construction and combinations of parts as will be hereinafter described and more particularly pointed out in the claims.

Referring to the drawings, in which like numerals of reference designate like parts in the several figures; Figure 1 is a side view of my improved device attached to a trolley pole; Fig. 2 is an end view thereof looking from the right of Fig. 1; Fig. 3 is an enlarged detail view of the wheel pin; Fig. 4 is a detail plan view of the cradle; Fig. 5 is an end view thereof looking from the left of Figs. 1 and 4; and Fig. 6 is a perspective view of the spring.

In the practice of my invention I provide a cradle or yoke that has two oppositely disposed, outwardly flaring sides 1—1 that are joined at one end by a tie bar 2 having a groove 3 therein and at the other end by a stop bar 10 and a loop bar 4 which extends under the trolley pole 5 and has an eye 6 therein within which the cord 15 is secured. Extending through the cradle, the harp 7 on the trolley pole, and the trolley wheel 8, is the wheel pin 9 with a nut 11 threaded thereon. The cradle is normally held in a substantially horizontal position by a U shape spring 13, the arms of which coil about the wheel pin 9 between the cradle and harp and terminate at their ends in fingers 14 that project under the sides of the cradle. The cradle is so mounted upon the wheel pin 9 that normally the upper edges of the sides 1 are in a horizontal plane slightly below that of the wire 12, and is there held by the spring 13 with the loop bar 4 in contact with the underside of the trolley pole. In this position the sides 1—1 pass under the cross wires and hangers that support the trolley wire without contacting therewith.

In operation, when the trolley wheel 8 leaves the trolley wire 12, the tension of the spring (not shown) upon the trolley pole throws the same upwardly and the wire lies between the face of the trolley wheel and the inside of one of the sides 1 preventing any further upward movement of the trolley pole. The wire is returned to the wheel by grasping the cord 15 and by a downward pull the cradle is swung upon the wheel pin 9, at which time the trolley wire will slide down the inner curved face of the side 1 until the tie bar 2 is elevated above the top of the trolley wheel, (shown by dotted lines in Fig. 1) when the wire will drop into the central groove 3 and hold it in line with and above the groove in the trolley wheel. Now, by releasing the pull upon the cord, the spring 13 returns the cradle to its original position and the wire drops into the groove in the trolley wheel. As the wire is always in contact with either the trolley wheel or cradle the current is never shut off and the lights are not extinguished, so as to leave the car in darkness. When the cradle has been moved upon its pivot mounting so as to elevate the wire above the trolley wheel, the stop bar 10 contacts with the trolley pole and stops its further movement in that direction, but the continued pull upon the cord draws the whole trolley pole down from the wire, as is necessary to reverse its position and for other purposes.

This device does not require a special type of trolley pole or trolley wheel, but may be applied to any of those in common use.

There are minor changes and alterations that can be made within my invention, and I would therefore have it understood that I do not limit myself to the exact construction herein shown and described, but claim all that falls fairly within the spirit and scope of the appended claims.

Having described my invention, what I claim as new and desire to secure by Letters Patent, is:—

1. In a device of the character described; a cradle designed to be applied to a trolley pole and moved about the axis of the trolley wheel, having outwardly flaring sides which terminate just below the top of said wheel and form a trough upon each side thereof when said wheel is in contact with the wire, said sides being joined at one end by a part having a notch therein.

2. In a device of the character described; a cradle, designed to be applied to a trolley wheel and move about the axis of the trolley wheel, having outwardly flaring sides which terminate just below the top of said wheel and form a trough upon each side thereof when said wheel is in contact with the wire, said sides being joined at one end by a part having a notch therein located in the center of the space between said sides, and joined at the other end by a loop bar.

3. In a device of the character described, the combination with a pole; of a grooved wheel rotatably mounted therein; a cradle rotatably mounted upon the same axis as said wheel having outwardly flaring sides which terminate just below the top of said wheel and form a trough upon each side thereof when said wheel is in contact with the wire, said cradle having a notch or groove in one end thereof in the same line as the groove in said wheel.

4. In a device of the character described, the combination with the pole; of a grooved wheel; a cradle, having outwardly flaring sides which terminate just below the top of said wheel and form a trough upon each side thereof when said wheel is in contact with the wire, said cradle having a notch in line with the groove in said wheel; a pin passing through said wheel, pole and cradle; and spring means for moving said cradle in one direction.

5. In a device of the character described, the combination with a pole; of a trolley wheel; a cradle, having outwardly flaring sides which terminate just below the top of said wheel and form a trough upon each side thereof when said wheel is in contact with the wire, said cradle having a notch in one end thereof in line with the groove in said wheel; means connected with the other end of said cradle whereby the movement thereof in one direction is limited; a pin upon which the said cradle and wheel are mounted; and spring means for moving said cradle upon said pin in one direction.

In testimony whereof I affix my signature in presence of two witnesses.

HENRY R. SHERMAN.

Witnesses:
GEORGE E. HALL,
FLORENCE H. MONK.